United States Patent
Kumar et al.

(10) Patent No.: US 7,340,441 B1
(45) Date of Patent: Mar. 4, 2008

(54) SEARCH DIRECTIONS IN PATTERN SEARCH VIA ROTATION

(75) Inventors: Rakesh Kumar, Framingham, MA (US); Jared Carlson, Arlington, MA (US)

(73) Assignee: The Mathworks, Inc., Natick, MA (US)

( * ) Notice: Subject to any disclaimer, the term of this patent is extended or adjusted under 35 U.S.C. 154(b) by 372 days.

(21) Appl. No.: 11/015,877

(22) Filed: Dec. 17, 2004

(51) Int. Cl.
*G06F 17/00* (2006.01)
*G06N 5/02* (2006.01)

(52) U.S. Cl. ...................................................... 706/46
(58) Field of Classification Search ................. 706/46
See application file for complete search history.

(56) References Cited

U.S. PATENT DOCUMENTS

| | | | | | |
|---|---|---|---|---|---|
| 5,058,034 | A | * | 10/1991 | Murphy et al. | 706/25 |
| 2004/0030665 | A1 | * | 2/2004 | Sullivan | 706/48 |

* cited by examiner

*Primary Examiner*—Anthony Knight
*Assistant Examiner*—Michael B. Holmes
(74) *Attorney, Agent, or Firm*—Lahive & Cockfield LLP

(57) ABSTRACT

In performing a pattern search algorithm to find an optimal solution for an optimization, using a set of positive basis vectors that is non-maximal like a set of minimal positive basis vectors as search directions can sometimes causes the algorithm to converge at a non-optimal solution, like a horse saddle. The present invention provides a method to overcome this deficiency by rotating the vectors and hence increase the number of search directions.

23 Claims, 5 Drawing Sheets

(Before Rotation)  (After Rotation)

SEARCH DIRECTIONS IN PATTERN SEARCH VIA ROTATION

BACKGROUND

Field of the Invention

The claimed invention is related to utilizing a pattern search algorithm in a technical computing environment.

Optimization is a process to find an optimal set of parameters in order to maximize or minimize certain objectives. Without any loss of generalization, the discussion below will assume that the objective always is to be minimized. The process of optimization is usually iterative. For example, the process starts with an initial guess $X_0$ and produces a sequence of iterates $X_1, X_2 \ldots X_k$ until some terminating condition is satisfied. An optimization problem in general form can be written as follows:

Minimize f(X), $X \epsilon R^n$, $f \epsilon R$ where f is the objective function to be minimized and X is the vector of variables. R represents all real numbers and $R^n$ represents all real numbers in n-dimensions.

There are many optimization techniques by which one can generate a sequence of iterations. One class of techniques that are of interest is direct search methods, specifically the ones utilizing the pattern search algorithm. Direct search methods do not require or estimate the derivative of the objective function like other classical optimization techniques. Direct search optimization techniques evaluate the objective function at a set of points around the current iterate $X_k$ in order to choose the next iterate to use in the next iteration.

The steps in a typical pattern search algorithm are described below.

Initialization of the algorithm $X_0$ is the chosen initial iterate.

$\Delta_{tol} > 0$ is the tolerance on the pattern size.

$\Delta$ is set to the initial value of the pattern size.

Body of the algorithm

Step 1: For j=0,1 . . . k, perform steps 2 to 4 unless $\Delta < \Delta_{tol}$, then terminate loop.

Step 2: A set of points, which is called a pattern, is created around the current iterate $X_j$. Each point in the pattern is situated at a distance, equal to the pattern size, away from the current iterate.

Step 3: If a point within the pattern has a lower output comparing to $X_j$ when provided as input to the objective function is found in the pattern, the point is marked as the new iterate $X_{j+1}$. Increment j by 1 and go back to step 1.

Step 4: If such a point is not found in the pattern, the pattern size $\Delta$ is reduced. The current iterate $X_j$ is not changed and j is incremented. Go back to step 1.

If the pattern search algorithm cannot find any improvement in the output (step 4) over the current iterate, the iteration is declared unsuccessful and the pattern size is reduced. If the iteration is unsuccessful, the algorithm checks if the current pattern size is small enough to stop the algorithm in step 1.

A pattern in a pattern search algorithm is typically constructed using a set of vectors which form a positive basis. A positive combination of $v_i \epsilon R^n$:i=1,2, . . . k can be expressed as $$\sum_{i=1}^{k} \alpha_i v_i = \alpha_1 v_1 + \ldots + \alpha_k v_k,$$

where $\alpha_1$ is scalar and not less than zero. A finite set of vectors $v_i \epsilon R^n$:i=1,2, . . . k forms a positive basis set B in $R^n$ if any vector $v \epsilon R^n$ can be expressed as a positive combination of the vectors in B.

It is common to use two kinds of positive basis sets as search directions in pattern search algorithms, namely maximal basis and minimal basis. It is known that the maximal and minimal basis set have 2n and n+1 vectors, respectively, for an n-dimensional optimization problem. FIG. 1A shows an exemplary maximal positive basis vectors in two dimensions ($R^2$). Vector 10, vector 12, vector 14 and vector 16, which use point O as their origin and are perpendicular to their adjacent vectors, form a set of maximal positive basis vectors in two-dimensional space. On the other hand, FIG. 1B shows an exemplary minimal positive basis vectors in the same dimensions. Vector 18, having the same origin as vector 10 and vector 12, forms a 135 degrees angle with both of the vectors. The three vectors form a set of minimal positive basis vectors in two-dimensional space.

In utilizing a pattern search algorithm, most of the computation time is spent evaluating the objective function. One single evaluation of the objective function can take anywhere from a few seconds (inexpensive) to several minutes (expensive). Using a set of maximal positive basis vectors (maximum number of evaluations per iteration) in a pattern search algorithm enables one to find the optimal solution of an objective function if there is one. However, using a set of minimal positive basis vectors (minimum number of evaluations per iteration) with a pattern search algorithm can sometimes cause the algorithm to stop at a horse saddle and "think" that a solution has been found. A method is needed for pattern search algorithms that do not utilize a set of maximal positive basis vectors such that an optimal solution to an objective function can still be as reliably found as methods using a set of maximal positive basis vectors.

SUMMARY

The present invention solves the above-identified problem. The present invention rotates the vectors to increase the number of search directions while keeping the same number of vectors that form the positive basis for the same dimensions.

In one embodiment of the present invention, a method of finding a solution of an optimization problem utilizing a pattern search algorithm in a technical computing environment is disclosed. The method includes finding a first set of vectors for use to find a solution of the optimization problem. The method also includes applying the first set of vectors as search directions in the pattern search algorithm to attempt to generate a first result. The method further includes rotating the first set of vectors to obtain a second set of vectors. The method also further includes applying the second set of vectors as new search directions in the pattern search algorithm to generate a second result.

In one aspect of the present invention, the method further includes failing to generate the first result when applying the first set of vectors as search directions in the pattern search algorithm. In another aspect of the present invention, the first set of vectors is a set of n+1 positive basis vectors in n dimensions. In yet another aspect of the present invention, the method further includes rotating the first set of vectors by 180 degrees to obtain the second set of vectors. In still another aspect of the present invention, the method further includes rotating the first set of vectors by a random angle to obtain the second set of vectors.

In another embodiment of the present invention, a method of finding a solution of an optimization problem utilizing a pattern search algorithm in a technical computing environment is disclosed. The method includes finding a first set of vectors for use to find the solution of the optimization problem. The method also includes rotating the first set of vectors to obtain a second set of vectors. The method further includes identifying a point as the origin of the first set of vectors and the second set of vectors, wherein said point is provided as input to a function representing the optimization problem, said function generates an output. The method also further includes applying alternatively the first and second set of vectors as search directions in the pattern search algorithm to find new points that yield a more favorable output than the origin point, the new points are used as the origin for the vectors in the successive iterations. The method lastly includes deciding programmatically the solution of the optimization problem is found when a stopping condition is reached.

In one aspect of the present invention, the stopping condition is when a pattern size is smaller than a predetermined value, a pattern size being a length along the search directions. In another aspect of the present invention, the method applies alternatively the first and second set of vectors as search directions by applying the first set of vectors as search directions; upon failure to obtain a new point that yields a more favorable output than the origin point, applying the second set of vectors as search directions. In yet another aspect of the present invention, the method applies alternatively the first and second set of vectors as search direction by applying the first set of vectors as search directions, upon failure to obtain a new point that yields a more favorable output than the origin point, reducing the pattern size and applying the second set of vectors at search directions.

In yet another embodiment of the present invention, a medium holding computer executable code for a method of finding a solution of an optimization problem utilizing a pattern search algorithm is disclosed. The method includes finding a first set of vectors for use to find the solution of the optimization problem. The method also includes applying the first set of vectors as search directions in the pattern search algorithm to attempt to generate a first result. The method further includes rotating the first set of vectors to obtain a second set of vectors. The method also further includes applying the second set of vectors as new search directions in the pattern search algorithm to generate a second result.

In still another embodiment of the present invention, a medium holding computer executable instructions for a method of finding a solution of an optimization problem utilizing a pattern search algorithm is disclosed. The method includes finding a first set of vectors for use with finding a solution of the optimization problem. The method also includes rotating the first set of vectors to obtain a second set of vectors. The method further includes identifying a point as the origin of the first set of vectors and the second set of vectors, wherein said point is provided as input to a function representing the optimization problem, said function generates an output. The method also further includes applying alternatively the first and second set of vectors as search directions in the pattern search algorithm to find new points that yield a more favorable output that the origin point. The method lastly includes deciding programmatically the solution of the optimization problem is found when a stopping condition is reached.

In still another embodiment of the present invention, a system for applying a pattern search algorithm to an optimization problem is disclosed. The system includes a programming environment for manipulating and analyzing the optimization problem. The system further includes an optimization module deploying the pattern search algorithm for rotating search directions when a set of non-maximal basis vectors is used as search directions.

In one aspect of the present invention, the system further comprises a storage medium storing said system and providing said system for distribution over a network. In another aspect of the present invention, the pattern search algorithm identifies a first set of vectors as search directions, and rotating the first set of vectors to obtain a second set of vectors as alternative search directions. In yet another aspect of the present invention, the second set of vectors is obtained by rotating the first set of vectors by 180 degrees.

DETAILED DESCRIPTION

The present invention discloses a method for improving the performance of a pattern search algorithm when using a set of non-maximal positive basis vectors as search directions. The present invention rotates the vectors to increase the number of search directions. The present invention finds an optimal solution of an objective function using a non-maximal positive basis in the pattern search algorithm and the solution is at least as reliable as using a set of maximal positive basis vectors in the pattern search algorithm.

Figure 2A:
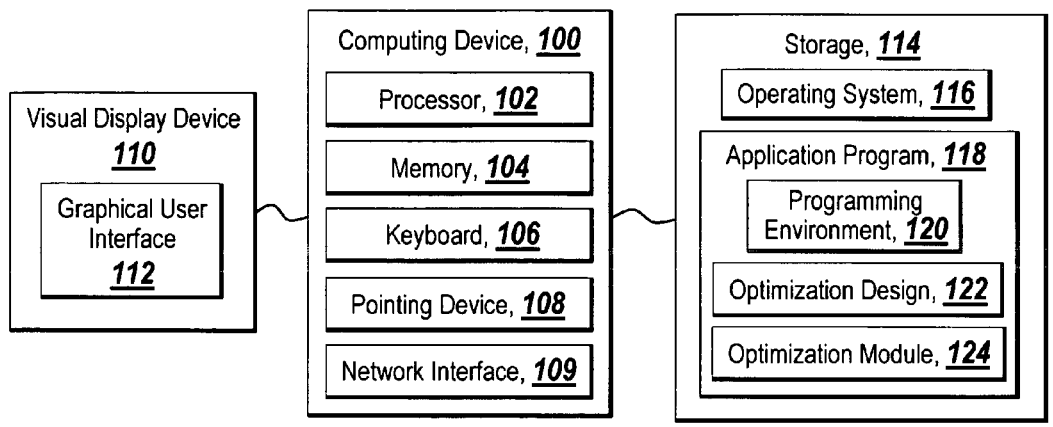
FIG. 2A illustrates a suitable environment for practicing the present invention in a single-computer computing environment.

FIG. 2A depicts an environment suitable for practicing an illustrative embodiment of the present invention. The environment includes a computing device 100 having memory 104, on which application program 118 according to one embodiment of the present invention may be stored, a processor 102 for executing the application program 118 stored in memory 104, and other programs for controlling system hardware. The computing device 100 may be any computer system such as a desktop computer, laptop, workstation, server, handheld computer, or other form of computing device that has sufficient processor power and memory capability to practice the present invention. The memory 104 may comprise a computer system memory or random access memory such as DRAM, SRAM, etc. The memory 104 may comprise other types of memory as well or combination thereof. A visual display 110, which includes a graphical interface, enables a user to interact with the computing device 100. The visual display 100 can be a computer monitor, TV, projector, and the like.

The computing device 100 may also include other devices, such as a keyboard 106, a pointing device 108 that may be connected to the visual display device 110. The computing device 100 may also include other peripherals to practice the present invention. The computing device 100 may further comprising a storage 114, such as a hard drive or CD-ROM, for storing operating system 116 and other software, and for sorting application program 118 which includes programming environment 120, optimization problem 122, and optimization module 124. Those skilled in the art will appreciate that optimization module 124 is adaptable to be included as part of the application program 118 or a stand alone application that responds to calls from the application program 118. The illustrative embodiments is described relative to a MATLAB® based application, however, one of ordinary skill in the art will appreciate that the present invention may be applied to other technical computing environments, such as those using software products of LabVIEW® from National Instruments, Inc., or System View® from Elanix, or Mathematica® from Wolfram Research, Inc., or Mathcad from Mathsoft Engineering & Eductation, Inc., or Maple™ from Maplesoft, a division of Waterloo Maple Inc, and the like.

Furthermore, the computing device 100 may include a network interface 109 to interface to a Local Area Network, Wide Area Network or the Internet through a variety of connections including, but not limited to, standard telephone lines, broadband connections, wireless connections, or some combination of any or all of the above. The network interface 109 may comprise a network adapter, a network card, or other devices that is suitable for interfacing the computing device 100 to any type of network capable of communications and practicing the present invention.

Figure 2B:
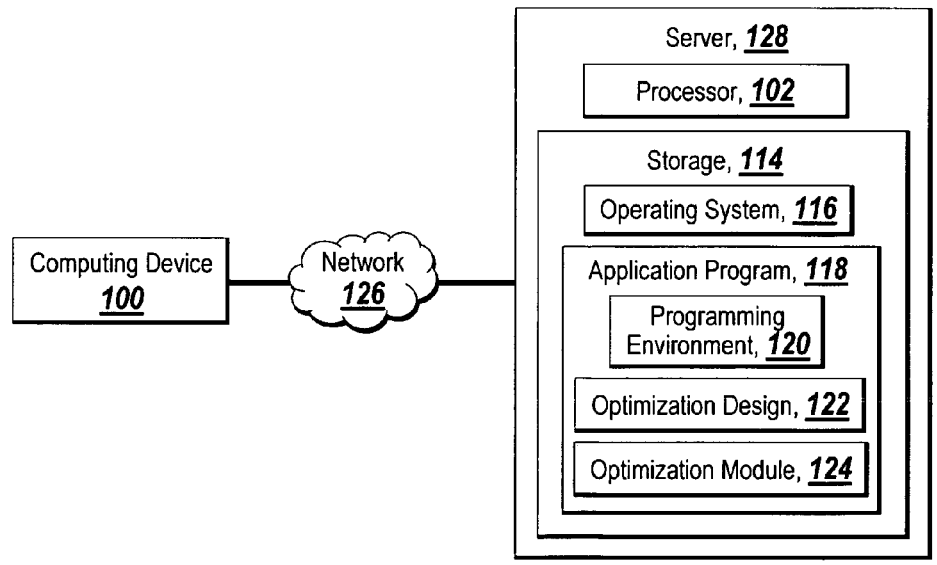
FIG. 2B illustrates a suitable environment for practicing the present invention in a client-server computing environment.

FIG. 2B illustrates an environment suitable for practicing the present invention in a client-server computing environment. Computing device 100 is coupled to a network 126, such as the Internet or an intranet, or other network either wired, wireless or a hybrid of wired or wireless. The server 128 coupled to the network 126 is adaptable to include processor 102' and storage 114' for storing operating system 116' and application program 118' which includes programming environment 120', optimization problem 122' and an optimization module 124'. Those skilled in the art will appreciate that optimization module 124' is adaptable to be included as part of the application program 118' or a stand alone application, either on the server 128 or elsewhere on the network, that responds to calls from the application program 118'. In this manner, any number of users is able to access the application program 118' via network 126 without the need to have a local copy (for example, application program 118) of the application program 118' on the storage 114. Alternatively, application program 118 on computing device 100 can be run on the server 128, utilizing its processing capability of processor 102'. Those skilled in the art will recognize that there are many other possibilities to practice the present invention in a client-server computing environment.

Figure 2C:
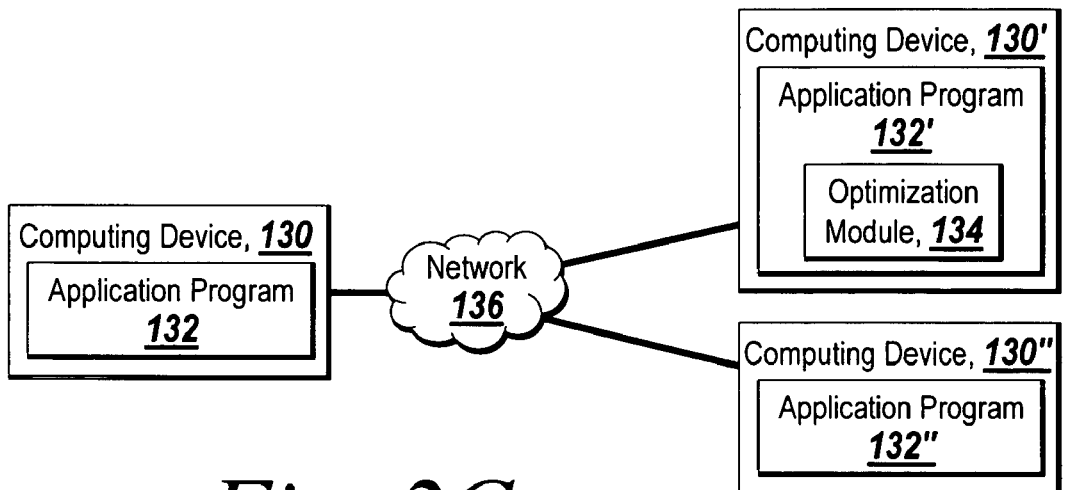
FIG. 2C illustrates a suitable environment for practicing the present invention in a distributed computing environment.

FIG. 2C depicts a suitable distributed computing environment for practicing the present invention. In this environment, a first computing device 130, a second computing device 130', and a third computing device 130" are coupled to a network 136, such as the Internet or an intranet, or other network either wired, wireless or a hybrid of wired or wireless. Computing devices 130, 130' and 130" may be any computer system such as a desktop computer, laptop, workstation, server, handheld computer, or other form of computing device that is capable of communication via network 136. Application program 132, application program 132' and application program 132" resides on computing device 130, computing device 130', and computing device 130" respectively. One of ordinary skill in the art will appreciate that functionality of the application program 132 can be either duplicated or distributed across multiple computing devices (130, 130', and 130") so that when the multiple computing devices work in communication and in collaboration with each other, the combination has the functionality of the overall application.

Optimization module 134 is illustrated as part of computing device 130'; however, those skilled in the art will recognized that optimization module can be a part of either the application program 132', application program 132, or application program 132". Alternatively, optimization module can be a stand alone application, residing in either of the computing devices 130, 130' or 130", which responds to calls from one or more of application programs 132, 132' and 132".

Those skilled in the art will further appreciate that the configuration in FIG. 2C can be equally applied to parallel execution of an application program in multiple execution environments, wherein the execution environments can be any one of the technical computing environments described herein. One skilled in the art will appreciate that there are many possible configurations to practice the present invention and the examples listed here is not meant to be limiting.

Figure 3:
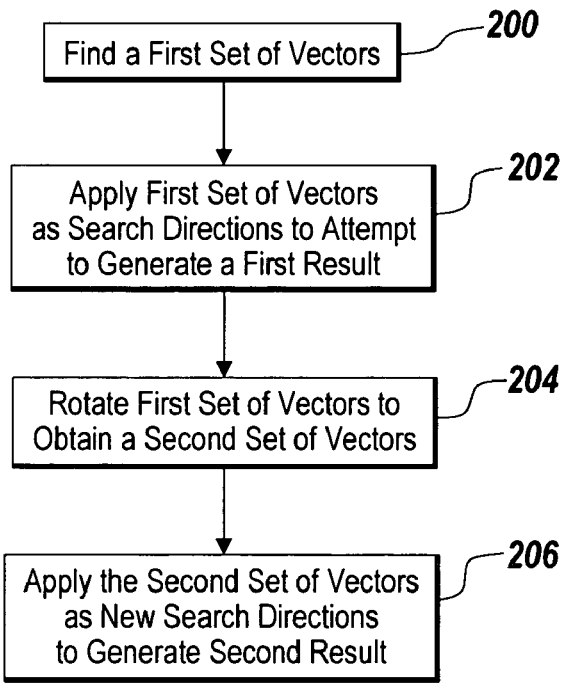
FIG. 3 shows a flowchart depicting the steps taken to practice one embodiment of the present invention.
Figure 4A:
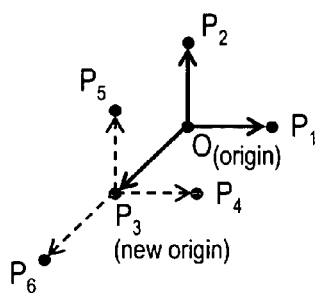
FIG. 4A illustrates an example of how a pattern search algorithm works using a set of minimal positive basis vectors in two dimensions as search directions.
Figure 4C:
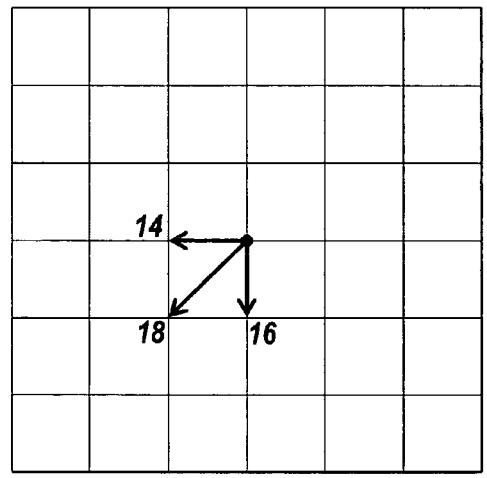
FIG. 4C illustrates components of a vector in two dimensions.
Figure 4B:
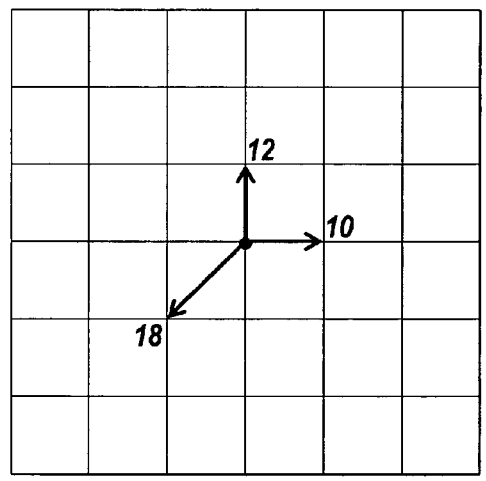
FIG. 4B illustrates the set of minimal positive basis vectors as shown in FIG. 1B before and after a rotation of 180 degrees.
Figure 4B:
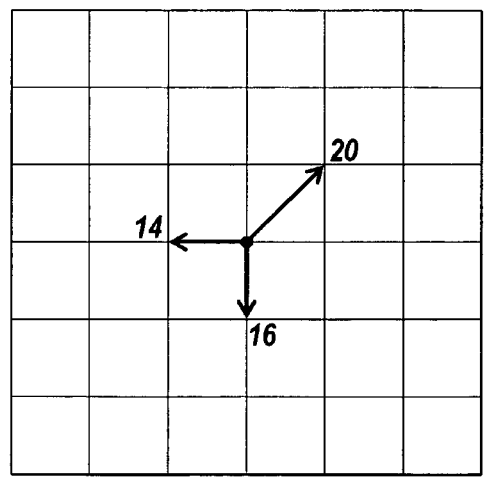

FIG. 3 shows a flowchart depicting the steps taken to practice one embodiment of the present invention. FIG. 4A, FIG. 4B, and FIG. 4C are discussed in connection with FIG. 3. FIG. 4A is an example of how a pattern search algorithm works using a set of minimal basis vectors as search directions in two dimensions. FIG. 4B illustrates the set of minimal basis vectors before and after rotation. FIG. 4C illustrates components of a vector in two dimensions.

Figure 1A:
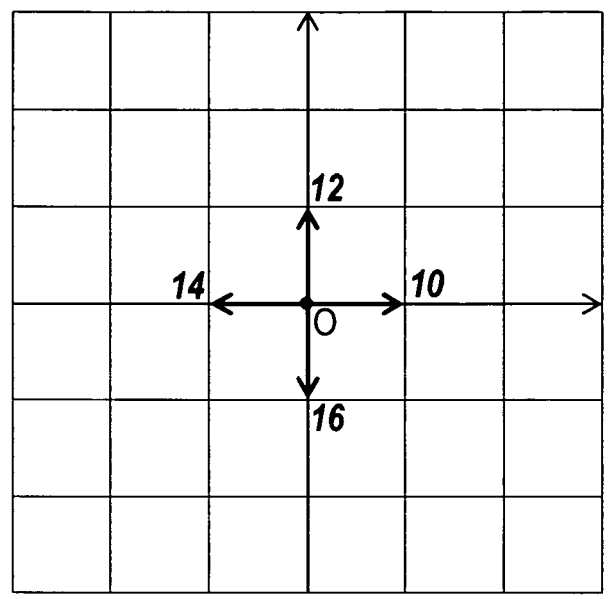
FIG. 1A illustrates exemplary maximal positive basis vectors in two-dimensional space.
Figure 1B:
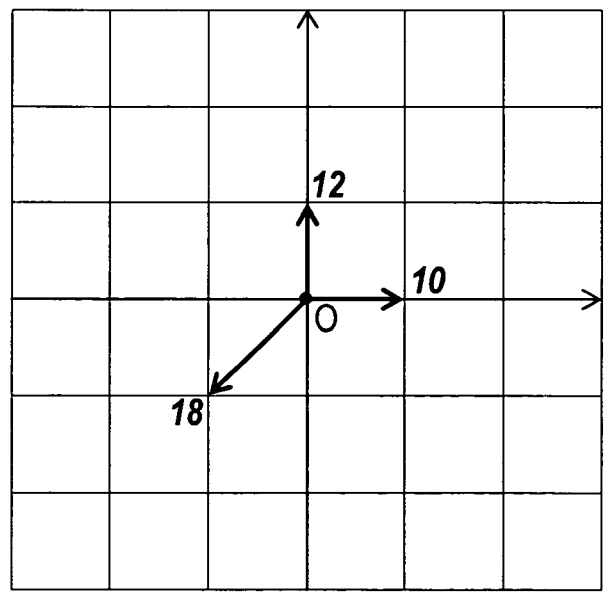
FIG. 1B illustrates exemplary minimal positive basis vectors in two-dimensional space.

In utilizing a pattern search algorithm to find a solution of an optimization problem, a first set of vectors is found (step 200). In one embodiment, the first set of vectors is a set of minimal (n+1) positive basis vectors in n dimensions. FIG. 1B illustrates one set of such vectors in two dimensions. The first set of vectors is then applied as search directions to attempt to generate a first result (step 202). As an example, the set of vectors in FIG. 1B is used as the first set of vectors and an initial iterate O is identified. This point is provided as input to a function representing the optimization problem and the function produces an associated output. The output is stored in memory where the objective function retrieves the best solution it has found so far. As shown in FIG. 4A, using point O as the origin, and vectors 10, 12, and 18 as search directions, point $P_1$, point $P_2$, and point $P_3$ are obtained by advancing in the search directions, from the origin, by a predetermined pattern size specifying a length. Point $P_1$, point $P_2$, and point $P_3$ are then provided as input to the objective function and the objective function produces three outputs corresponding to the three points. Assuming that point $P_3$ yields the most favorable output compared to both point $P_1$ and point $P_2$ and also yields a more favorable output than the current iterate O. Point $P_3$ is then identified as the next iterate. Alternatively, the next iterate can be identified as soon as a first point in the pattern is found to yield a more favorable output than the current iterate.

The output of point $P_3$ replaces the value in memory where the best solution so far is stored. Applying the same set of vectors (10, 12 and 18) as search directions using the new iterate $P_3$ as origin, point $P_4$, point $P_5$, and point $P_6$ are then obtained using the same pattern size. The objective function then evaluates these three points in the pattern and determines if anyone yields a more favorable output than the current stored best output. If so, the next iterate is found and the iteration continues.

If an attempt to find a more favorable solution fails with the first set of vectors, a new set of vectors to be used as new search directions is required. By rotating the first set of vectors, a second set of vectors is obtained (step 204). Taking the vectors 10, 12, 18 in FIG. 1B as an example, rotating each vector by 180 degrees and the resultant set of vectors is shown in FIG. 4B. Vectors 14, 16, and 20 are obtained from rotating vectors 10, 12, and 18, respectively.

In order to better demonstrate why rotating vectors helps to find a better solution for the optimization problem, an example situation is given here. Imagine that at some iterate $P_n$, vectors 10, 12 and 18 are applied as search directions using the iterate as the origin. The example situation has the condition that there is a slight increase in the direction of vector 10, and a dramatic increase in the direction of vector 12. One of ordinary skill can appreciate that vector 18 can be decomposed to be represented by two vectors 14 and 16 perpendicular to each other as shown in FIG. 4C. The example situation also has the condition that there is a fast increase in the direction of vector 16 and a very slow decrease in the direction of vector 14. This specific example can result in an overall increase in the vector 18 direction. Therefore, in this specific example, observing at point $P_n$, there is an increase in all the three search directions as defined by vector 10, 12 and 18, and the pattern search algorithm would fail to find a more favorable point using the current set of vectors 10, 12 and 18.

Therefore, if only using vectors 10, 12 and 18 in a typical pattern search algorithm to find an optimal solution for an optimization problem, it is possible that a non-optimal solution is reached. However, by rotating these vectors by 180 degrees as shown in FIG. 4B, vectors 14, 16, and 20 are applied as new search directions, and since there is a very slow decrease in the vector 14 direction, a new iterate can be found using this new set of search directions. Furthermore, due to the 180 degrees of rotation, the present invention converts six search directions in two dimensions and vectors 10, 12, 14, and 16 form a set of maximal positive basis vectors. Therefore, the present invention is at least as reliable as a pattern search algorithm utilizing a set of maximal positive basis vectors as search directions.

In a preferred embodiment of the present invention, the first set of vectors is rotated by 180 degrees to obtain the second set of vectors. In another embodiment of the present invention, the first set of vectors is rotated by a random angle to obtain the second set of vectors. The second set of vectors is applied as new search directions to generate a second result (step 206).

Figure 5:
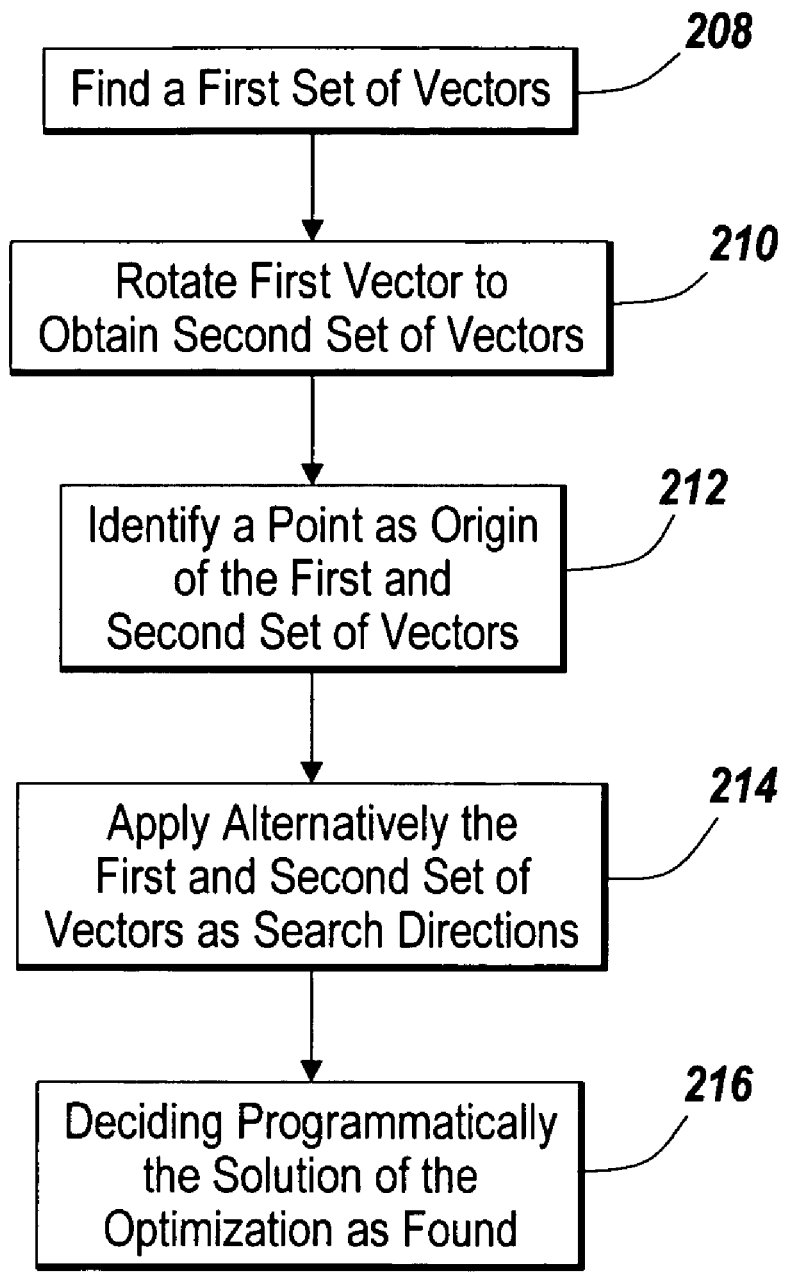
FIG. 5 shows a flowchart depicting the steps taken to practice another embodiment of the present invention.

FIG. 5 shows a flowchart depicting the steps taken to practice another embodiment of the present invention. In utilizing a pattern search algorithm to find a solution of an optimization problem, a first set of vectors is found (step 208). The second set of vectors is obtained by rotating the first set of vectors (step 210). A point is identified as the origin of the first and second set of vectors (step 212). The point is provided as input to a function representing the optimization problem. The function generates an output. The first set of vectors and the second set of vectors are applied as search directions alternatively in the pattern search algorithm to find new points that yield a more favorable output than the origin point (step 214). In one embodiment of the present invention, the first set of vectors is applied as search directions first to find a new point that yields a more favorable output, and upon failure, the second set of vectors is applied as search directions next to find a new point that yields a more favorable output. In another embodiment of the present invention, the first set of vectors is applied as search directions, and upon failure to obtain a new point that yields a more favorable output than the origin point, the pattern size is reduced and the second set of vectors is applied as search directions to find a new point that yields a more favorable output. When a stopping condition is reached, it is decided programmatically the solution is found (step 216). In one embodiment of the present invention, the stopping condition is when a pattern size representing a distance between the origin point and the new point is smaller than a predetermined value.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are in substantially different, even though not identical in other respects to what is shown and described in the above illustrations.

We claim:

1. In a technical computing environment, a computer-implemented method of finding a solution of an optimization utilizing a pattern search algorithm, said method comprising the steps of:
   (a) finding a first set of vectors forming a positive basis for use with the optimization;
   (b) applying the first set of vectors as search directions in the pattern search algorithm to attempt to generate a first result;
   (c) rotating the first set of vectors to obtain a second set of vectors; and
   (d) applying the second set of vectors as new search directions in the pattern search algorithm to generate a second result, wherein the first result and the second result are saved in a storage element and compared to determine a more favorable result.

2. The method of claim 1, wherein step (b) further comprises the step of:
   failing to generate the first result.

3. The method of claim 1, wherein the first and second set of vectors are n+1 positive basis vectors in an n-dimensional space.

4. The method of claim 1, wherein step (c) further comprising the step of rotating the first set of vectors by 180 degrees.

5. The method of claim 1, wherein step (c) further comprising the step of rotating the first set of vectors by a random angle.

6. The method of claim 1, wherein the technical computing environment is a distributed computing environment.

7. A computer-implemented method of finding a solution of an optimization utilizing a pattern search algorithm, said method comprising the steps of:
   (a) finding a first set of vectors forming a positive basis for use with the optimization;
   (b) rotating the first set of vectors to obtain a second set of vectors;
   (c) identifying a point as the origin of the first set of vectors and the second set of vectors, wherein said point is provided as input to a function representing the optimization, said function generates an output;
   (d) applying alternatively the first and second set of vectors as search directions in the pattern search algorithm to find new points that yield a more favorable output than the origin point, wherein the more favorable output is saved in a storage element, and the new points are used as the origin for the vectors in the successive iterations; and
   (e) deciding programmatically the solution of the optimization is found when a stopping condition is reached.

8. The method of claim 7, wherein the stopping condition is when a pattern size is smaller than a pre-determined value, a pattern size being a length along the search directions.

9. The method of claim 7, wherein step (d) further comprising the steps of:
   applying the first set of vectors as search directions; upon failure to obtain a new point that yields a more favorable output than the origin point,
   applying the second set of vectors as search directions.

10. The method of claim 8, wherein step (d) further comprising the steps of:
    applying the first set of vectors as search directions; upon failure to obtain a new point that yields a more favorable output than the origin point;
    reducing the pattern size; and
    applying the second set of vectors as search directions.

11. A computer-readable storage medium holding computer executable code for finding a solution of an optimization utilizing a pattern search algorithm, said instructions comprising instructions for:
    (a) finding a first set of vectors forming a positive basis for use with the optimization;
    (b) applying the first set of vectors as search directions in the pattern search algorithm to generate a first result;
    (c) rotating the first set of vectors to obtain a second set of vectors; and
    (d) applying the second set of vectors as new search directions in the pattern search algorithm to generate a second result, wherein the first result and the second result are saved in a storage element and compared to determine a more favorable result.

12. The medium of claim 11, wherein instruction (b) further comprise instructions for:
    failing to generate the first result.

13. The medium of claim 11, wherein the first set of vectors is a set of n+1 positive basis vectors in an n-dimensional space.

14. The medium of claim 11, wherein instructions (c) further comprise instructions for rotating the first set of vectors by 180 degrees.

15. The medium of claim 11, wherein instructions (c) further comprise instructions for rotating the first set of vectors by a random angle.

16. The medium of claim 11, wherein the medium is operated within a distributed computing environment.

17. A computer-readable storage medium holding computer executable instructions for finding a solution of an optimization utilizing a pattern search algorithm, said instructions comprising instructions for:
    (a) finding a first set of vectors forming a positive basis for use with the optimization;
    (b) rotating the first set of vectors to obtain a second set of vectors;
    (c) identifying a point as the origin of the first set of vectors and the second set of vectors, wherein said point is provided as input to a function representing the optimization, said function generates an output;
    (d) applying alternatively the first and second set of vectors as search directions in the pattern search algorithm to find new points that yield a more favorable output than the origin point, wherein the more favorable output is saved in a storage element; and
    (e) deciding programmatically the solution of the optimization is found when a stopping condition is reached.

18. The medium of claim 17, wherein the stopping condition is when a pattern size is smaller than a predetermined value, a pattern size being a length along the search directions.

19. A system for applying a pattern search algorithm to an optimization, said system comprising:
    a processor for providing a programming environment for manipulating and analyzing the optimization;
    a computer-readable storage element for storing an optimization module deploying the pattern search algorithm for rotating search directions when non-maximal basis vectors are used as search directions,
    wherein results of applying the search directions in the pattern search algorithm are saved in the storage element.

20. The system of claim 19, wherein said system is provided for distribution over a network.

21. The system of claim 19, wherein the pattern search algorithm identifies a first set of vectors as search directions, and rotating the first set of vectors to obtain a second set of vectors as alternative search directions.

22. The system of claim 21, wherein the second set of vectors is obtained by rotating the first set of vectors by 180 degrees.

23. The system of claim 19, wherein the system is provided in a distributed computing environment.

* * * * *